Dec. 31, 1963  C. A. DEHNE  3,115,846
VERTICAL CURVE SECTION FOR CONVEYOR SYSTEMS
Filed April 5, 1962  5 Sheets-Sheet 1
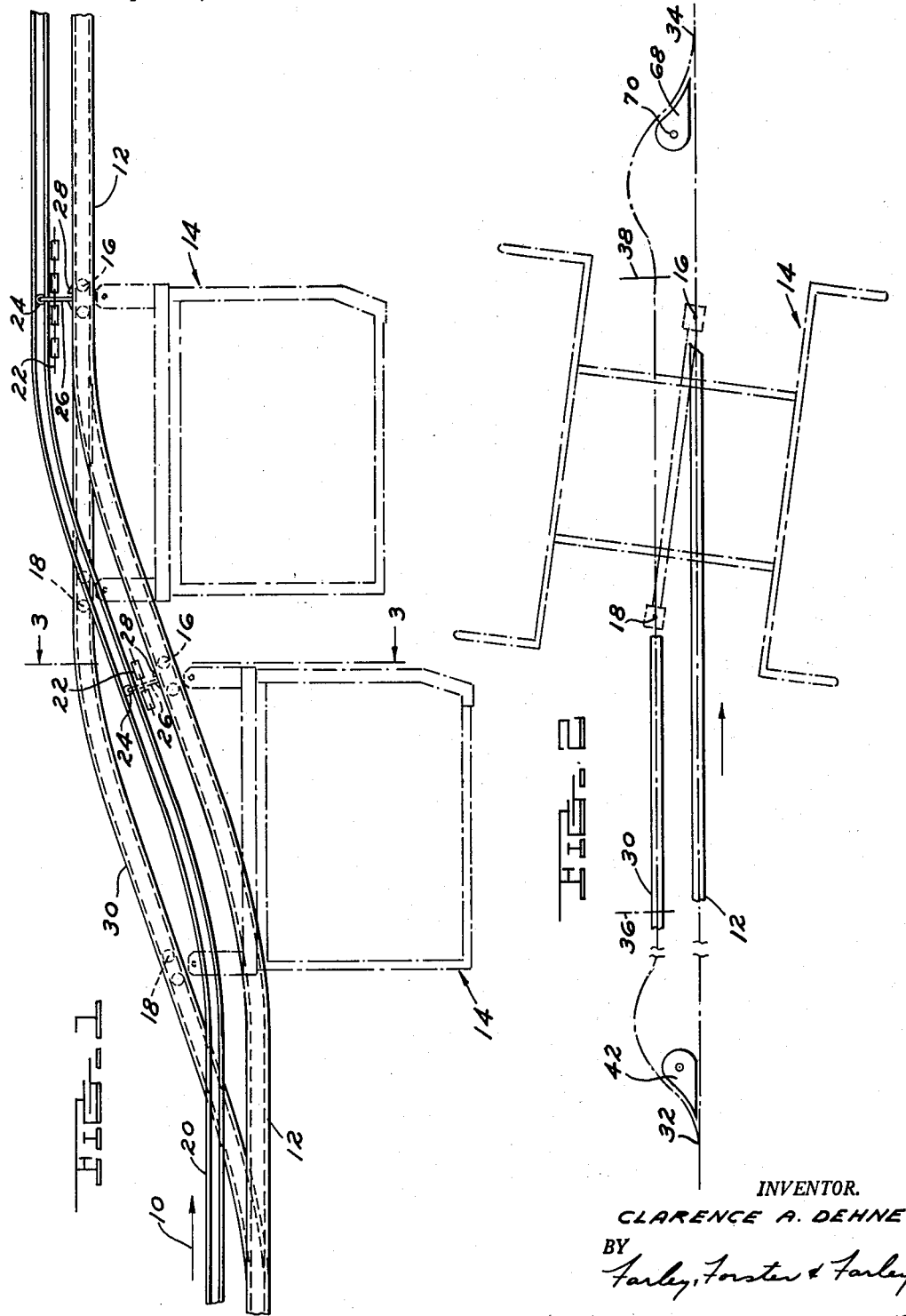
INVENTOR.
CLARENCE A. DEHNE
BY
Farley, Forster & Farley
ATTORNEYS Dec. 31, 1963 C. A. DEHNE 3,115,846
VERTICAL CURVE SECTION FOR CONVEYOR SYSTEMS
Filed April 5, 1962 5 Sheets-Sheet 2
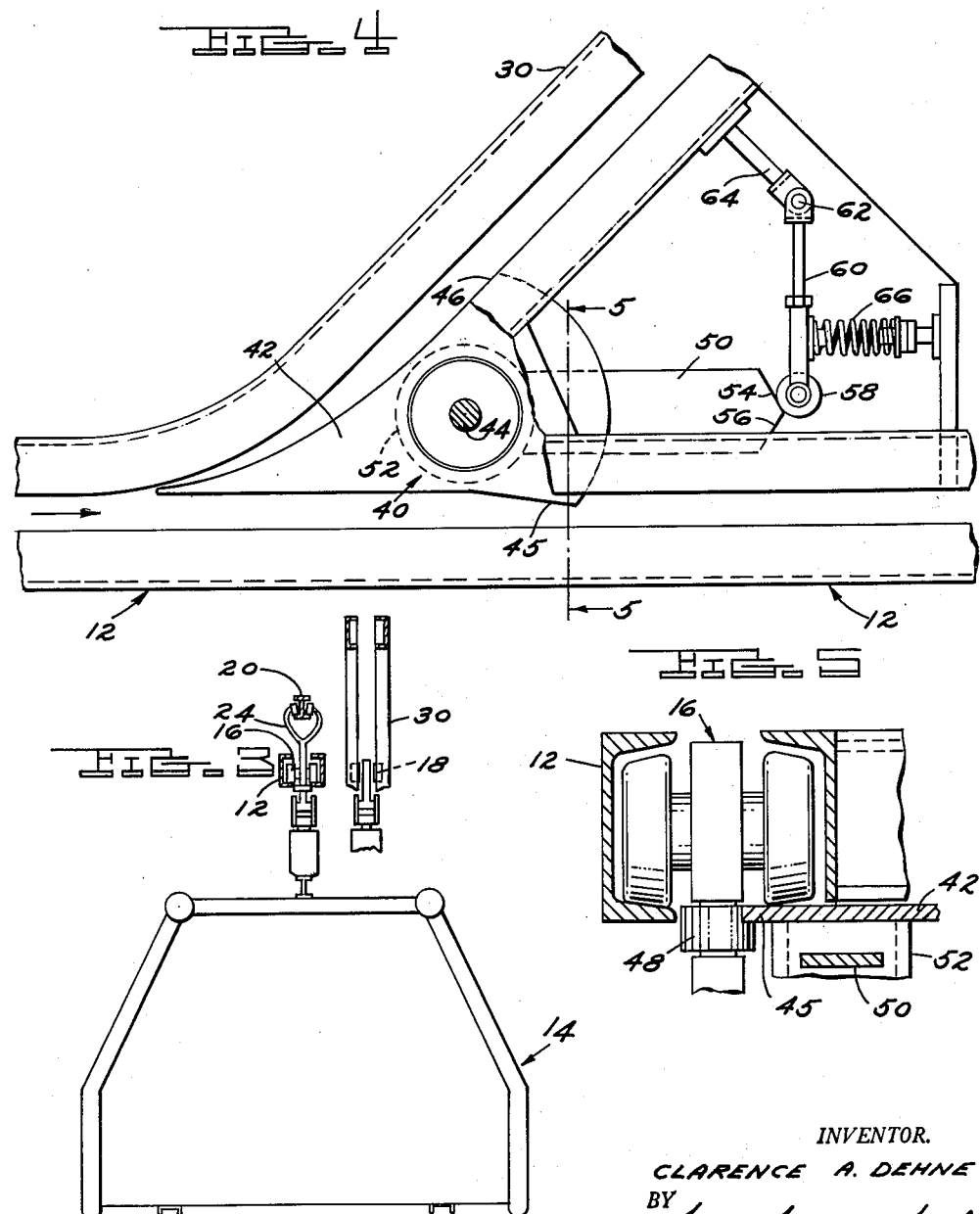
INVENTOR.
CLARENCE A. DEHNE
BY
ATTORNEYS Dec. 31, 1963    C. A. DEHNE    3,115,846
VERTICAL CURVE SECTION FOR CONVEYOR SYSTEMS
Filed April 5, 1962    5 Sheets-Sheet 3
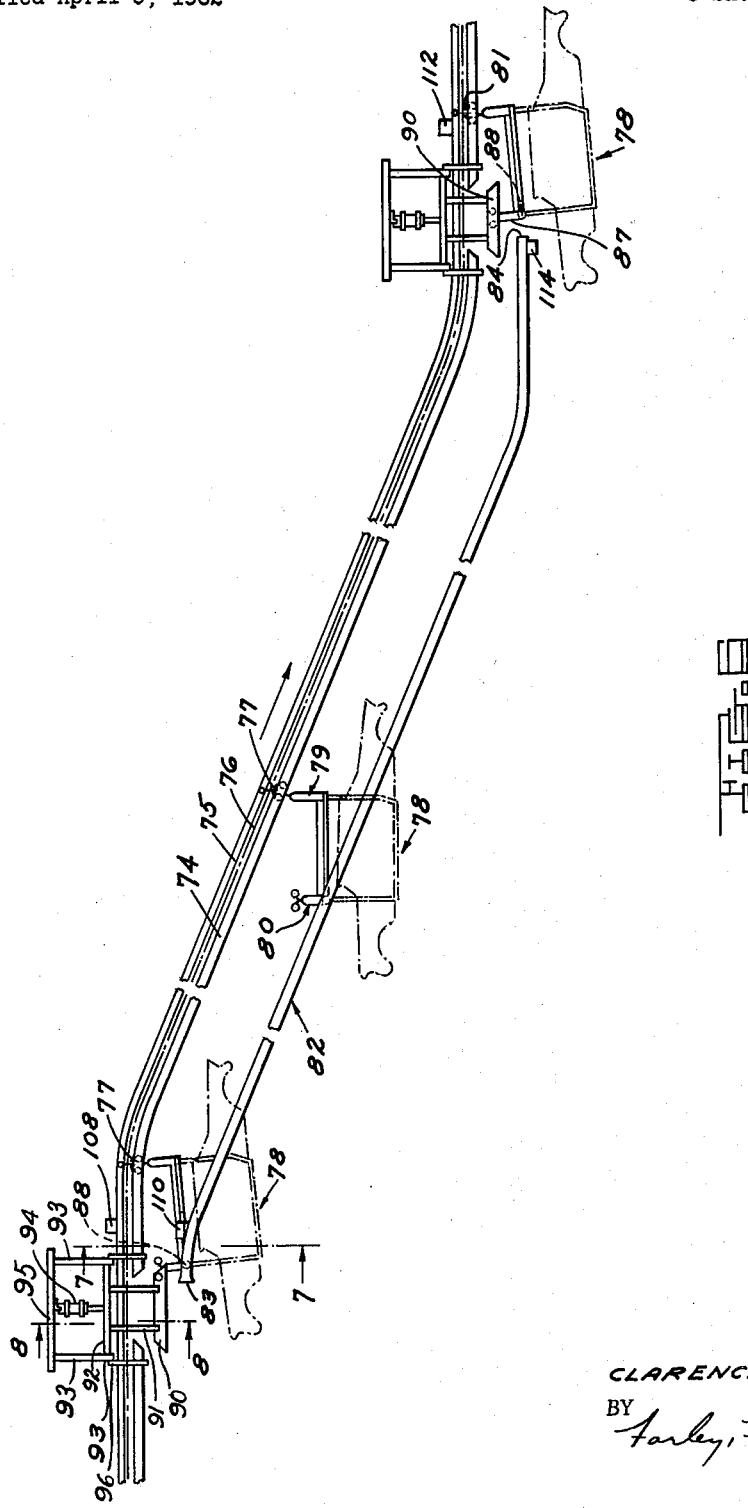
INVENTOR.
CLARENCE A. DEHNE
BY Farley, Forster & Farley
ATTORNEYS Dec. 31, 1963   C. A. DEHNE   3,115,846
VERTICAL CURVE SECTION FOR CONVEYOR SYSTEMS
Filed April 5, 1962   5 Sheets-Sheet 4
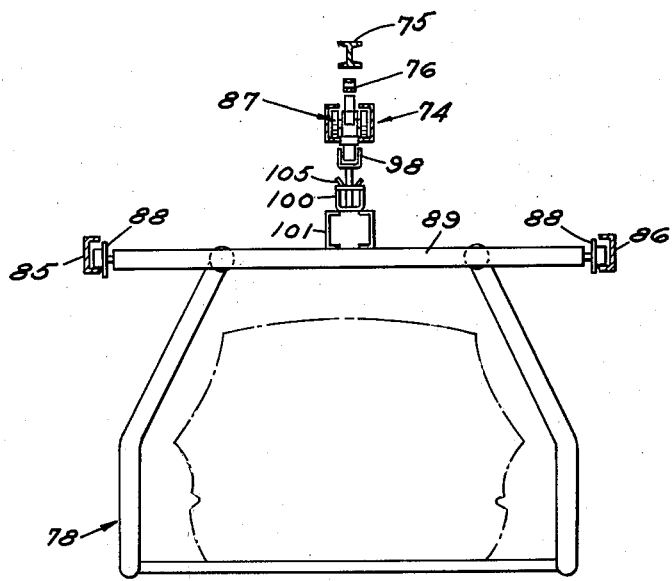
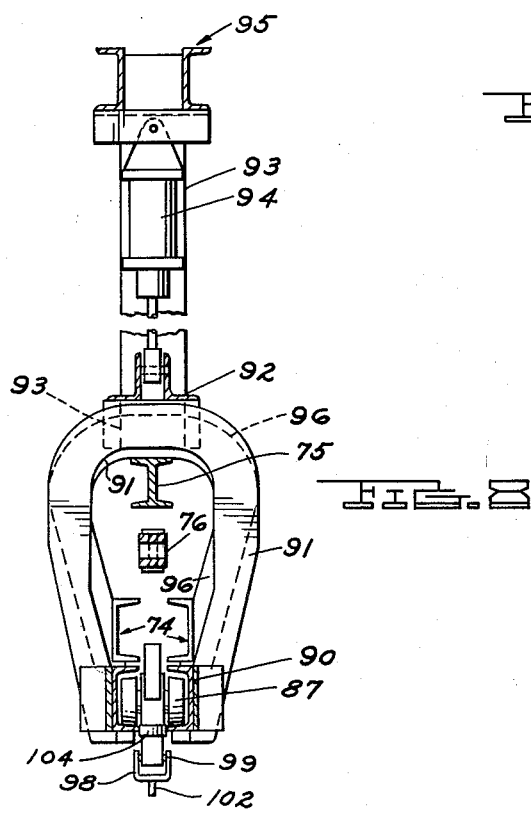
INVENTOR.
CLARENCE A. DEHNE
BY
*Farley, Forster & Farley*
ATTORNEYS Dec. 31, 1963  C. A. DEHNE  3,115,846
VERTICAL CURVE SECTION FOR CONVEYOR SYSTEMS
Filed April 5, 1962  5 Sheets-Sheet 5
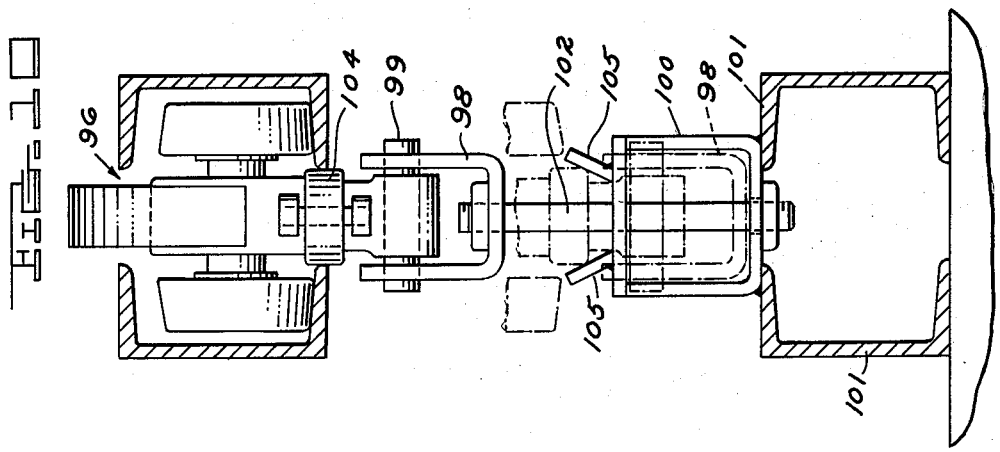
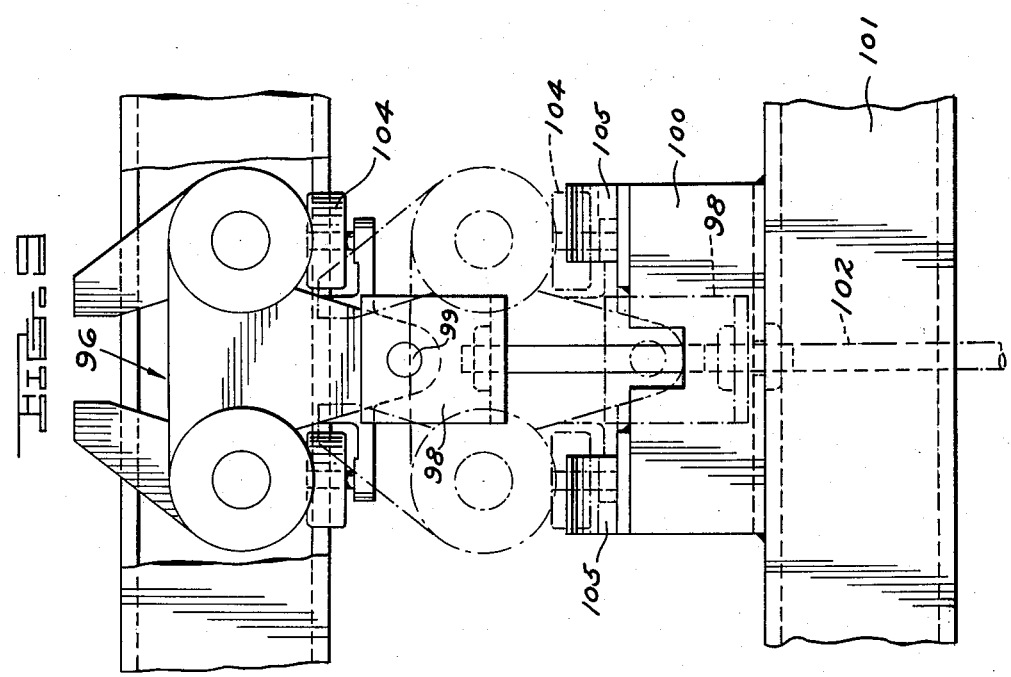
INVENTOR.
CLARENCE A. DEHNE
BY
*Farley, Forster & Farley*
ATTORNEYS United States Patent Office 3,115,846
Patented Dec. 31, 1963

3,115,846
VERTICAL CURVE SECTION FOR CONVEYOR SYSTEMS
Clarence A. Dehne, Garden City, Mich., assignor to Jervis B. Webb Company, Detroit, Mich., a corporation of Michigan
Filed Apr. 5, 1962, Ser. No. 185,362
6 Claims. (Cl. 104—178)

This invention relates to an improved construction for a vertical curve section of a conveyor system—that is, a section on which a carrier ascends or descends from one level to another—and relates particularly to conveyor systems of the type employing a load carrier suspended from front and rear trolley means which travel along a main load carrying track propelled by means supported on a track running adjacent and parallel thereto.

In a conveyor system of the foregoing type, the present invention provides a vertical curve section comprising an auxiliary load carrying track which extends through the vertical curve section in spaced relation to the main load carrying track from an entrance located in advance of the curve section, to an exit located following the curve section. Two-position transfer means are mounted at the entrance for transferring one trolley means of a carrier which is adapted to travel on either the auxiliary or main load carrying tracks, from engagement with the main load carrying track into engagement with the auxiliary load carrying track. The main and auxiliary load carrying tracks are arranged to follow divergent vertical paths through the curve section with the track configuration being designed to maintain a desired attitude of the carrier, which, in most cases, will maintain the load supported by the carrier in a horizontal or constant attitude throughout the change in elevation. Two-position transfer means are also provided at the exit of the auxiliary load carrying track for retransferring the said one trolley means of each carrier back into engagement with the main load carrying track, together with means for actuating each of the entrance and exit transfer means from one position to another in response to the passage of each trolley means.

Two representative vertical curve constructions of the invention will be described in detail herein with the general objects and advantages to be attained by each being to convey a double-trolley carrier through a change in vertical elevation at a greater inclination of ascent or descent, thereby achieving in most cases a reduction in conveyor length; to minimize the possibility of a load shifting on a carrier during a change in elevation; to simplify carrier construction by eliminating the necessity of special load anchoring means to prevent such shifting; to enable carriers to be spaced closer together on the conveyor without interference due to swinging of a carrier in traversing a vertical curve; and to increase the utility of a conveyor in the handling of certain loads under specialized conditions, such as transporting liquids, or handling loads into and out of dip tanks, etc.

Other objects and advantages will appear from the following descriptions of the presently preferred representative embodiments of the invention disclosed in the accompanying drawings which consist of the following views:

FIGURE 1, a side elevation of a vertical curve section;
FIGURE 2, a schematic plan view including the entrance and return junctions between the main and auxiliary load carrying tracks;
FIGURE 3, a sectional elevation taken as indicated by the line 3—3 of FIGURE 1;
FIGURE 4, a plan view of a representative form of switch mechanism installed at the entrance junction;
FIGURE 5, a sectional elevation taken as indicated by the line 5—5 of FIGURE 4;
FIGURE 6, a side elevation of a second form of vertical curve construction;
FIGURE 7, a transverse elevation on an enlarged scale taken as indicated by the line 7—7 of FIG. 6;
FIGURE 8, an enlarged transverse elevation taken as indicated by the line 8—8 of FIGURE 6;
FIGURE 9, an enlarged side elevation showing details of the connection between a carrier and one of its supporting trolleys; and
FIGURE 10, an end view of the structure shown in FIGURE 9.

Referring to FIGURES 1 and 2, an overhead conveyor of the "power and free" type is shown travelling in the direction of the arrow 10 through a vertical curve section, ascending from a lower level to a higher level. This conveyor includes a main load carrying track 12 along which carriers 14, suspended from a front trolley 16 and a rear trolley 18, are moved by propelling means supported on a separate track 20 which is located above and parallel to the main load carrying track 12. The propelling means consist of an enless chain 22 connected to trolleys 24, at least some of which are provided with depending pusher members 26 for driving engagement with pusher dogs 28 carried by the front carrier trolley 16.

An auxiliary load carrying track 30 extends through the vertical curve section, as shown in the plan view FIGURE 2, from an entrance junction 32 with the main load carrying track 12 in advance of the vertical curve to a return junction 34 with the main load carrying track 12 following the vertical curve. The auxiliary load carrying track 30 is arranged in laterally spaced relation with the main load carrying track 12 as shown in the plan view, FIGURE 2, and in elevation the auxiliary load carrying track 30 and main load carrying track 12 follow divergent paths through the portion where the conveyor is changing level, this portion lying approximately between the lines 36 and 38 of FIGURE 2.

A two-position switch is mounted at the entrance junction 32 and consists of a plate-like tongue member 42 carried on a vertical pivot 44 (FIG. 4). Switch actuating means include a portion 45 of the tongue which projects into the path of travel of a trolley along the main load carrying track 12 in the one switch position shown in FIGURE 4, and a portion 46 which will project into the path of travel along the auxiliary load carrying track 30 when the switch tongue is moved to its other position. These switch portions 45 and 46 are engaged by the guide roller 48 (FIG. 5) of a passing trolley and when so engaged cause the switch to be thrown from one position to another.

Detent means are also provided for controlling switch position. Secured to the switch supporting collar 52 is a member 50 having tapered terminal surfaces 54 and 56 engageable by a roller 58 on the end of an arm 60. Arm 60 is pivotally connected at 62 to a supporting bracket 64, and is normally urged to engage the roller 58 against one of the tapered surfaces 54 or 56 by a spring 66. This engagement between the roller 58 and one of the tapered surfaces 54 or 56 not only acts to retain the switch in the position to which it is thrown, but also aids in moving the switch.

A return switch 68 is mounted at the junction 34 and consists of a tongue member somewhat similar to the one just described except that no particular means are necessarily required to actuate this tongue member or control its position. Being freely pivoted at 70, it will move from one position to another as each carrier trolley passes through the junction.

When a carrier 14 approaches the vertical curve section, it will be assumed that the entrance switch 40 is in the main line position shown in FIGURE 4 and consequently, when the carrier front trolley 16 passes through the switch, the trolley guide roller 48 will contact the switch portion 45 and throw the switch to its other position. The rear carrier trolley 18 will then be transferred to the auxiliary load carrying track 30 for travel through the vertical curve section, but in passing through the switch 40, the rear carrier trolley will engage the switch portion 46 and cause the switch to be thrown back to the position shown in FIGURE 4.

The vertical configurations of the main load carrying track 12 and auxiliary load carrying track 30 are such that when the front carrier trolley 16 travels on the main track and the rear carrier trolley 18 on the auxiliary track, the carrier is maintained in a desired constant attitude which in this instance is one wherein the load remains in a horizontal position throughout the change in elevation.

On a descending elevation, the arrangement shown would naturally be reversed, the main load carrying track following a path similar to that shown for the auxiliary load carrying track, and vice versa.

The construction shown in FIGS. 6–10, while modified, accomplishes the same overall results with certain additional advantages. A main load carrying track 74 and adjacent parallel propelling track 75 are shown passing through a descending vertical curve section, a propelling chain 76 equipped with longitudinally spaced pushers 77 being carried by the track 75.

Carriers 78 are each equipped with longitudinally spaced front and rear trolley means 79 and 80 both of which normally travel on the main load carrying track 74, the front trolley 79 being equipped with the usual pusher and holdback dogs 81.

An auxiliary load carrying track 82 extends from an entrance 83 located in advance of the vertical curve to an exit 84 located following the vertical curve. This auxiliary load carrying track 82 is, as shown in FIG. 7, composed of a pair of transversely spaced track members 85 and 86 located in laterally spaced relation to either side of the main load carrying track 74 and in vertically spaced relation therewith.

One of the trolley means of each carrier, in this case the rear trolley means 80, is adapted to travel on either the main or auxiliary load carrying tracks, being composed of a main trolley 87 and a pair of flanged outboard rollers 88 mounted at the ends of a cross-member 89 forming part of the structure of the carrier 78.

Transfer means are provided at the entrance 83 and also at the exit 84 for transferring the trolley means 80 of the carrier from engagement with the main load carrying track into engagement with the auxiliary load carrying track, and vice versa, comprising a vertically movable section 90 of the main load carrying track 74. Each track section 90 is located along the path of travel in vertical overlapping relation with the adjacent entrance or exit end of the auxiliary load carrying track, and is supported by suitable hangers 91 from an overhead member 92 which is movable vertically in guides 93 by an actuating cylinder 94 suspended from a fixed overhead member 95. Guides 93 are anchored to hangers 96 which form part of the fixed propelling and main load carrying track structure.

Main trolley 87 must be connected to its carrier 78 so as to permit relative articulation between the trolley and the carrier on a vertical axis in order to permit the carrier to traverse horizontal curves in the system. Special connecting means, best shown in FIGS. 9 and 10, are employed in the present construction for permitting this articulation while providing means for maintaining a fixed relative position between the trolley and carrier when the vertical curve section is traversed and the main trolley 87 is disengaged from the main load supporting track 74. The connecting means include a U-shaped bracket 98 connected to the trolley body by a horizontal pin 99 and connected to a complementary U-shaped bracket 100 secured to the main longitudinal carrier members 101 by a vertical pin 102 which extends slidably through the brackets 98 and 100. During a transfer operation at the entrance 83 of the auxiliary load carrying track, with the vertically movable section 90 lowered, the auxiliary trolleys 88 enter into engagement with the auxiliary track members 85 and 86 and then the main trolley 87 rolls off the end of the track section 90. The trolley 87 then falls down to the position shown in dashline in FIGS. 9 and 10 in which the bracket 98 is nested within the carrier bracket member 100 and the trolley guide rollers 104 are cradled within upwardly diverging members 105 secured to the upper portion of the bracket 100.

At the exit of the vertical curve section, this operation is reversed, the trolley 87 engaging the lowered track section 90 before the auxiliary trolleys 88 reach the end 84 of the track members 85 and 86; and, when the auxiliary trolleys 88 roll off the auxiliary tracks the main trolley 87 returns to normal supporting relation with the carrier.

Operation is as follows:

When a carrier 78 approaches the entrance to the vertical curve section, the movable track section 90 of the entrance transfer means is in its upper position aligned with the main load carrying track 74 and remains in this position until after the leading carrier trolley means 79 passes over the movable section 90. A control device 108 located following the movable section 90 constitutes one element of means for actuating the entrance transfer means from one of its positions to the other position in response to passage of the leading trolley, this actuation taking place after the following rear trolley means 80 is supported on the movable section 90. The movable section 90 is then lowered by the actuating cylinder 94 to its other position in which the auxiliary trolleys 88 are aligned for engagement with the entrance 83 of the auxiliary track members 85 and 86. After the main trolley 87 of the rear trolley means 80 rolls off the track section 90, a second control element 110 is actuated in response to the passage of one of the auxiliary trolleys to return the transfer means to its other or main line position.

The operation of the transfer means at the exit end of the curve section is similar, the movable track section 90 being in main line position for the passage of the leading trolley 79 of each carrier, being moved to its other position in response to the passage of such trolley and being returned to main line position after the main trolley of the rear trolley means has engaged the movable track section 90 and the auxiliary trolleys 88 have been disengaged from the auxiliary tracks. Limit switch and solenoid valve elements 112 and 114 are employed to control the operation of the return transfer means. Since these control elements and their relationship with the actuating cylinder of the transfer means are well known, it is not thought necessary to disclose them in detail.

The construction of FIGS. 6–10, while involving slightly more structure than that of FIGS. 1–5, offers certain additional advantages. A steeper ascent or descent can be obtained from the combination of outboard auxiliary rollers and auxiliary load supporting tracks than is ordinarily possible with the single auxiliary track of FIGS. 1–5. This construction also offers the advantages of a three rail type carrier system since the outboard trolleys 88 can be employed in conjunction with carrier stabilizing tracks through work areas where this feature is desirable.

While preferred embodiments have been described above in detail, it will be understood that numerous modifications might be resorted to without departing from the scope of the invention as defined in the following claims.

I claim:

1. A vertical curve section for a conveyor having a main load carrying track, load carriers each provided with longitudinally spaced front and rear trolley means normally engaging said main load carrying track, and carrier propelling means mounted on a track running parallel to and adjacent the main load carrying track; said vertical curve section comprising (a) an auxiliary load carrying track extending through the vertical curve section in vertically spaced relation to the main load carrying track from an entrance located in advance of the curve section to an exit located following the curve section, (b) at least one of the trolley means of each carrier being adapted to travel on either of said main and auxiliary load carrying tracks, (c) two-position transfer means mounted at the auxiliary track entrance for transferring said one trolley means of each load carrier from engagement with the main load carrying track into engagement with the auxiliary load carrying track, (d) the main and auxiliary load carrying tracks being arranged to follow different vertical paths through the curve section whereby a desired horizontal attitude of the carrier is maintained, (e) two-position transfer means mounted at the auxiliary load carrying track exit for retransferring the said one trolley means of each carrier back into engagement with the main load carrying track, and (f) means for actuating each of the entrance and exit transfer means from one position to another in response to the passage of each trolley means.

2. A vertical curve section according to claim 1 wherein said auxiliary load carrying track consists in a pair of track members transversely spaced, one of said auxiliary track members being mounted on each side of the main load carrying track, said one trolley means of each carrier comprising a main trolley adapted to travel on the main load carrying track and a pair of auxiliary trolleys each adapted to travel on one of said auxiliary track members.

3. A vertical curve section according to claim 2 wherein said auxiliary track members are located in vertically spaced relation to the main load carrying track at the entrance and exit of said auxiliary load carrying track, said entrance and exit transfer means each comprising a vertically movable section of the main load carrying track, and means for moving said section between one position in which it is aligned with the main load carrying track and a second position in which the auxiliary trolleys are aligned with the auxiliary track members and the main trolley is below the main load carrying track for disengagement therefrom during travel of a carrier through said vertical curve section.

4. A vertical curve section according to claim 3 further characterized by means for maintaining a certain positional relationship between the main trolley and the carrier when the main trolley is disengaged from the main load carrying track.

5. A vertical curve section according to claim 1 further characterized by a junction provided between the main and auxiliary track at both the entrance and exit thereof, said auxiliary load carrying track extending from the entrance junction into laterally and vertically spaced relation with the main load carrying track through the vertical curve section, and a two-position switch mounted at each of said junctions.

6. A vertical curve section according to claim 5 wherein each of said two-position switches is provided with a member projecting into the path of trolley travel for physical engagement thereby to move said switch from one position to another.

References Cited in the file of this patent
UNITED STATES PATENTS

| | | |
|---|---|---|
| 475,102 | Wolfrom | May 17, 1892 |
| 709,692 | Acklin | Sept. 23, 1902 |
| 898,008 | Sayer | Sept. 8, 1908 |
| 1,917,837 | Haddlesay | July 11, 1933 |
| 2,128,492 | Mena | Aug. 30, 1938 |
| 2,802,427 | Da Costa | Aug. 13, 1957 |